Figure 1:
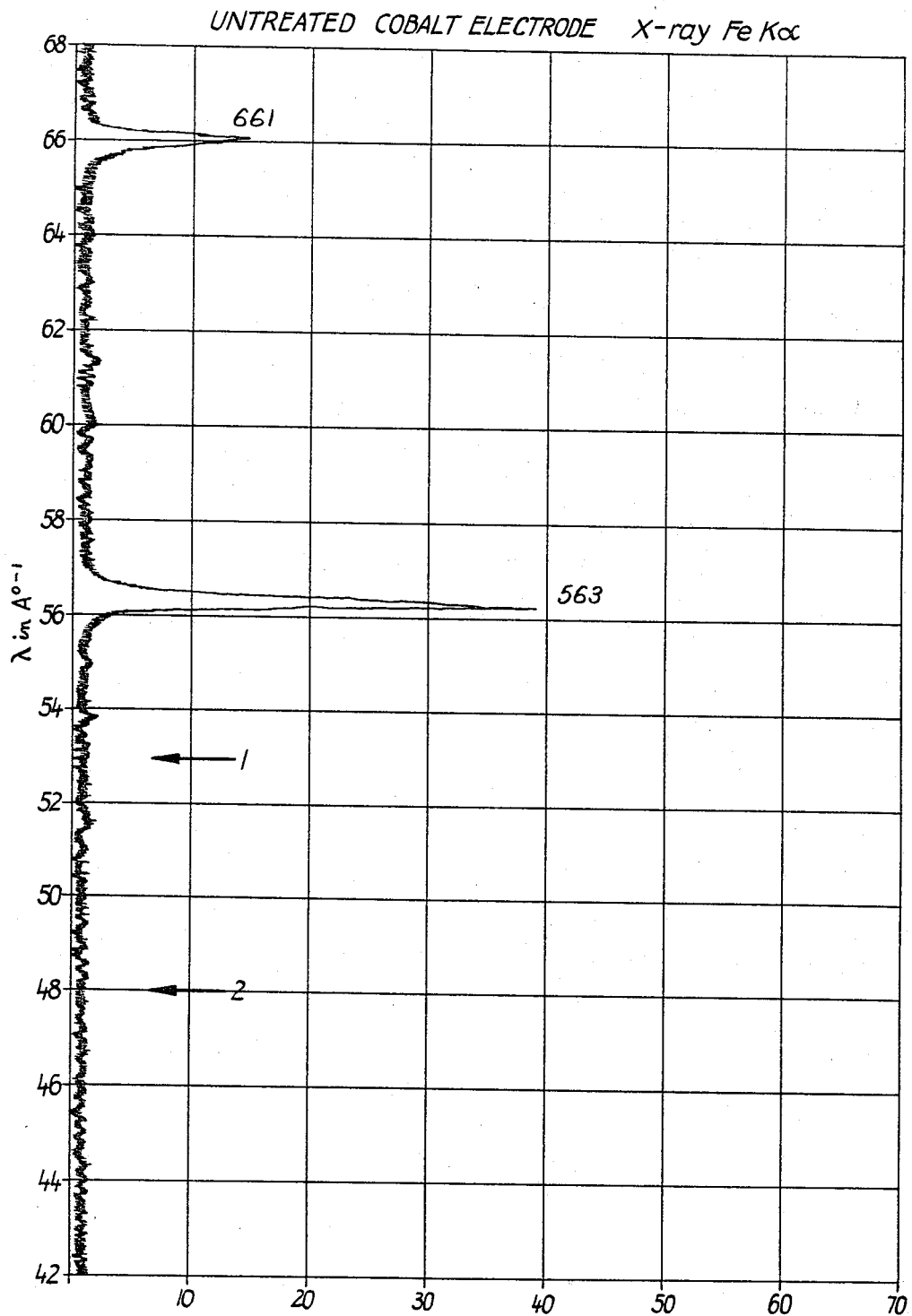

United States Patent Office 3,382,106
Patented May 7, 1968

3,382,106
METHOD OF PRODUCING CATALYST BODY INCLUDING SORBING HYDROGEN INTO BODY
Margarete Jung, Nieder-Eschbach, Germany, and Hanns H. Kroeger, Gainesville, Fla., assignors to Varta Aktiengesellschaft, Hagen, Westphalia, Germany, a corporation of Germany
Continuation-in-part of application Ser. No. 475,459, July 28, 1965. This application Sept. 7, 1965, Ser. No. 485,573
Claims priority, application Germany, Dec. 17, 1960, A 36,312; Jan. 28, 1961, A 36,601; Feb. 7, 1961, A 36,666
14 Claims. (Cl. 136—120)

This invention is a continuation-in-part of copending applications Ser. No. 475,459, filed July 28, 1965 which itself is a continuation-in-part application of Ser. No. 161,278, filed Dec. 21, 1961, and of applications Ser. No. 159,265 and Ser. No. 170,811, filed Dec. 14, 1961 and Feb. 2, 1962, now abandoned, respectively.

The present invention relates to the production of catalytic bodies useful in all reactions based on the transfer of hydrogen. The catalytic bodies of the invention may be used, for instance, in all hydrogenation and dehydrogenation reactions as well as in galvanic elements, such as fuel cells, which operate with a fuel comprising hydrogen as an active component. Another embodiment of the invention provides a method for reactivating the catalytically active metal component of an electrode which has decreased catalytic activity due to, for instance, exposure to air in dry condition.

Various catalytic bodies are well known but their production is time-consuming and accordingly expensive because all known production methods require a number of stages some of which are rather complex. For instance, it has been proposed to manufacture such catalytic bodies or powders by decomposing readily reducible compounds of catalytically active metals, such as oxides, carbonates, or oxalates, in a stream of hydrogen at elevated temperature. This method, however, has the disadvantage of requiring a very exact decomposition temperature since the metal would be sintered too strongly if the temperature is too high, thus reducing the porosity, the catalytically active surface and the corresponding activity of the catalytic body below an acceptable level. A low temperature, on the other hand, causes incomplete reduction so that the catalytic activity of the body would again be impaired and its mechanical rigidity would be unsatisfactory. Also, this procedure requires a very expensive apparatus, the material for the reduction furnace causing particular difficulties because hydrogen tends to diffuse through many metals at high temperatures.

In another known method, a catalytically active metal, such as iron, cobalt, or nickel, is alloyed with an inactive metal, for instance, aluminum, zinc, or silicon, and the alloy is pulverized. The inactive metal is then dissolved out of the alloy, preferably by means of a concentrated alkaline solution, whereby a catalytically active metal with an extensive surface is obtained, and is simultaneously activated. This method, too, is expensive because of its many steps and the requirement for a large amount of activating solution.

Moreover, many catalysts suitable for electrodes which have been proposed for the electrochemical conversion of various fuels, including liquid and solid fuels dissolved in an alkaline electrolyte, are prone to disactivation. They loose their activity on exposure to air and must be reactivated before they are useful for operation in a fuel cell. For this reason, such electrodes must be stored and transported under water or another protective liquid, for instance, the fuel cell electrolyte itself. Thus, delivery of such fuel cell elements is possible only in conjunction with a relatively large amount of liquid. If this liquid is the electrolyte containing the fuel dissolved therein, a further disadvantage is the fact that a part of the fuel is decomposed before the fuel cell is placed into operation, i.e. without gaining electrical power therefrom.

Reactivation of such an electrode which had lost its activity has been found to take considerable time until the electrode again reached its full activity. It may take one or even several days before the final working potential of the fuel cell electrode has been reached. During this entire time, fuel is used up without substantial amounts of electric power being obtained from the cell. The activation process involves also the deposition of reaction products in the interior of the spongy catalyst, causing polarization before the operating voltage is delivered.

It is a primary object of the present invention to overcome the disadvantages of known methods of producing catalytic bodies. The invention provides a simple and inexpensive method for making catalytically active electrodes either from materials catalytically inactive or from materials which have a decreased catalytic activity or even lost it altogether for one reason or another.

Thus, an embodiment of the present invention provides a method for activating electrodes which have lost at least a part of their catalytic activity. This method eliminates the usual waste or dissipation of fuel which is caused, for instance, by the reactivation of platinum metal catalysts or catalytic electrodes in fuel cells, in accordance with conventional methods.

The method of the invention comprises bringing in contact a body having a metal crystal lattice with a substance having the property of catalyzing hydration and dehydration reactions. More specifically the method comprises impregnating with an alkaline solution of a strong reducing agent a body having a metal crystal lattice receptive to the sorption or incorporation of hydrogen. In accordance with the invention, the lattice comprises at least one alkali-resistant crystalline metal which is a metal of Groups IVB, VB, VIB, or VIII of the Periodic Chart, (as specified in "Lange's Handbook of Chemistry" 1956 on pages 56 and 57), or an alloy of such a metal. For instance, titanium, thorium, zirconium, hafnium, niobium, wolfram, vanadium, tantalum, chromium, iron, cobalt and nickel, are suitable for the purpose of the present invention. The alloys of such metals are useful materials for this purpose, too. The platinum metals are also suitable for the invention. The metals are platinum, palladium, and their alloys with noble metals, particularly palladium-silver alloys, iridium, rhodium, or ruthenium. When alloys are used in the invention they may comprise an amount of the specified metals sufficient to accomplish the desired purpose. Thus the alloys may comprise from about 0.1 percent, or from about 0.5 percent by weight of the specified metals, the lower ranges being generally preferred when the noble metals are used. Of course, the metals need not be an alloy.

The metallic lattices used in accordance with the invention are characterized by the crystalline structure of their metals which is capable of sorbing and releasing atomic hydrogen. The hydrogen is both absorbed into the crystalline, inner portions of the structure as well as adsorbed on the surfaces by surface tension. The metallic lattices used are capable of sorbing a volume of atomic hydrogen which varies with the particular type of the specified metal used. In general, the lattices used distinguish themselves by their ability to sorb at least about 100 times the volume of the metal content, sometimes the increase in volume is about 300%. In other terms, based on 100 grs. of metal, the metals used are capable of sorbing, or having occluded to the lattice, at least 0.01 cm.³ of hydrogen ions (at 25° C.). For instance, titanium is capable of sorbing about 40,000 cm.³ of hydrogen (at 20° C.) and platinum or palladium can sorb a volume of hydrogen of about 600 to 1000 times their metal volume while nickel can sorb a volume of hydrogen of at least 200 times its metal volume. The ability to sorb hydrogen is an important characteristic of the metals used in the invention. When the lattice has sorbed all the hydrogen it is capable of, gaseous hydrogen is then formed and evolved.

The reducing agent which is used in accordance with the invention is a compound which decomposes in alkaline solution upon contact of the solution with the metallic material generating atomic hydrogen. Useful compounds include reducing agents of complex metal hydrides soluble in aqueous alkali, such as complex boron hydrides and complex aluminum hydrides, hydrazine and its salts and derivatives, hydroxylamine, its derivatives and its salts. Alkali metal boron hydrides, such as sodium boron hydrides, also designated as sodium boranate of the formula NaBH₄, and lithium aluminum hydride, also designated as lithium alanate of the formula LiAlH₄, have been found to be very effective reducing agents in alkaline solutions. Other complex hydrides, such as lithium boron hydride, potassium boron hydride, aluminum boron hydride and the like may also be used. The derivatives of the specified compounds include those in which at least one hydrogen atom is substituted by an organic radical such as alkyl, (as of 1 to 4 or 6 carbon), phenyl or benzyl. The salts of the specified compounds include the chlorides, the sulfates, sulfites, and the like.

Amongst the reducing agents sodium boron hydride is the most economical of the useful materials but lithium boron hydride may be preferred because it also improves the electrical conductivity of the electrolyte.

The lattice which is activated in accordance with the invention, with the compounds described, can be in the form of the powder of the selected catalytic metal, or the catalyst may be in the form of the desired self-sustaining mechanically stable body, for instance, a porous sintered body. The lattice to be treated may be porous or compact. Or, a porous carrier may be impregnated with the selected metal. For instance, platinum, palladium, and its noble metal alloys, and iridium may be used in this manner. Also rhodium and ruthenium are often used in finely divided form in a porous carrier, such as activated carbon.

Where, in accordance with the invention, a powder of the selected catalytic metal is treated, the increase in volume due to hydrogen sorption is a measurable increase due to surface expansion. When mechanically self-sustaining bodies are used, the hydrogen absorption may cause a decrease of the porosity of the body without measurably increasing the outer dimension of the body. When compact bodies are treated they may tend to become wavy on their surface.

Methods of impregnating porous carriers with finely divided platinum metals are well known and are described, for instance, in "Anorganische Chemie" by K. A. and U. R. Hofmann, Friedrich Vieweg & Sohn, Brunswick, Germany, 1948, pages 632 to 637. Useful porous supports or carriers for the catalysts of the invention are described, for instance, in copending U.S. patent application Ser. No. 112,015, filed May 23, 1961 and entitled "Catalytic Electrode for Fuel Cells and Method for Its Manufacture."

When the selected metal is used with a matrix, normally, the amount of metal will amount to about 0.2% to 20%, by weight, of the entire electrode of the invention. Preferably it ranges between about 1% to 12%. But no matrix need be used for the purposes of the invention for the preparation of the desired catalysts.

The amount of reducing substance which is used for the activation may vary within wide limits. For practical and economic reasons, the amount of reducing additive in the electrolyte will usually vary between about 1% and 50%, by weight, of the solvent for the additive, preferably about 10% to 30%. The reducing agent may be added to the aqueous alkaline solution all at once or it may be added incrementally during activation. It may be added to the electrolyte in a fuel cell.

The process of the invention comprises sorbing hydrogen into the above-described lattice, by immersing the material into an alkaline solution of the selected reducing agent which generates atomic hydrogen upon contact of the solution with the specified metals. In accordance with the invention, the creation of catalytic activity within the metallic lattice takes place while no essentially visible gaseous hydrogen is evolved but rather by the sorption of the hydrogen in statu nascendi by the metallic lattice. Without assigning a particular theory explaining the present invention, there are reasons to believe that the catalytic activity is created by hydrogen in atomic form.

The hydrogen released from the reducing agent in contact with the metallic material is incorporated into the metallic lattice and remains occluded there partly as a lattice alloy and partly in the form of a true hydride.

In accordance with the invention, the creation of cataly sites, or catalytic activation is essentially completed when the lattice has sorbed the maximum amount of hydrogen of which it is capable and when gaseous hydrogen starts evolving from the alkaline solution. Thus, gaseous hydrogen evolves only when the metallic material is practically fully saturated with hydrogen. Accordingly, the process of activation itself is carried out essentially without visible evolution of gaseous hydrogen and may be discontinued when evolution of gaseous hydrogen is observed. Normally, the process is essentially terminated when gaseous hydrogen starts evolving. However, when an adequate degree of catalytic activity is developed prior to complete saturation of the body by atomic hydrogen, the activation may be discontinued prior to the evolution of gaseous hydrogen.

This aspect of the invention provides a sharp distinction over various known processes for activating poisoned catalyst by means of gaseous hydrogen which, by chemical reaction, reduce the materials that poison the catalyst.

In accordance with the process of the invention, it is preferred to effect the impregnation of the lattice with atomic hydrogen at a temperature between about 5° C. and 80° C., preferably between 10° C. and 60° C. If a porous body is treated, desirably the reducing agent solution is forced through the porous body, either by applying it thereto under superatmospheric pressure or under suction applied to one side of the porous body. The activation of powders may be promoted by stirring of the solution of the reducing agent. The non-porous, non-powders are merely dipped.

During the activation process of the invention, as hydrogen is sorbed, the suspended metal looses its metallic luster, becomes flaky and darker.

The treated metallic catalyst of the invention is characterized by an X-ray diffraction pattern which shows, in some cases, a change in the crystalline structure of the metallic body.

Figure 2:
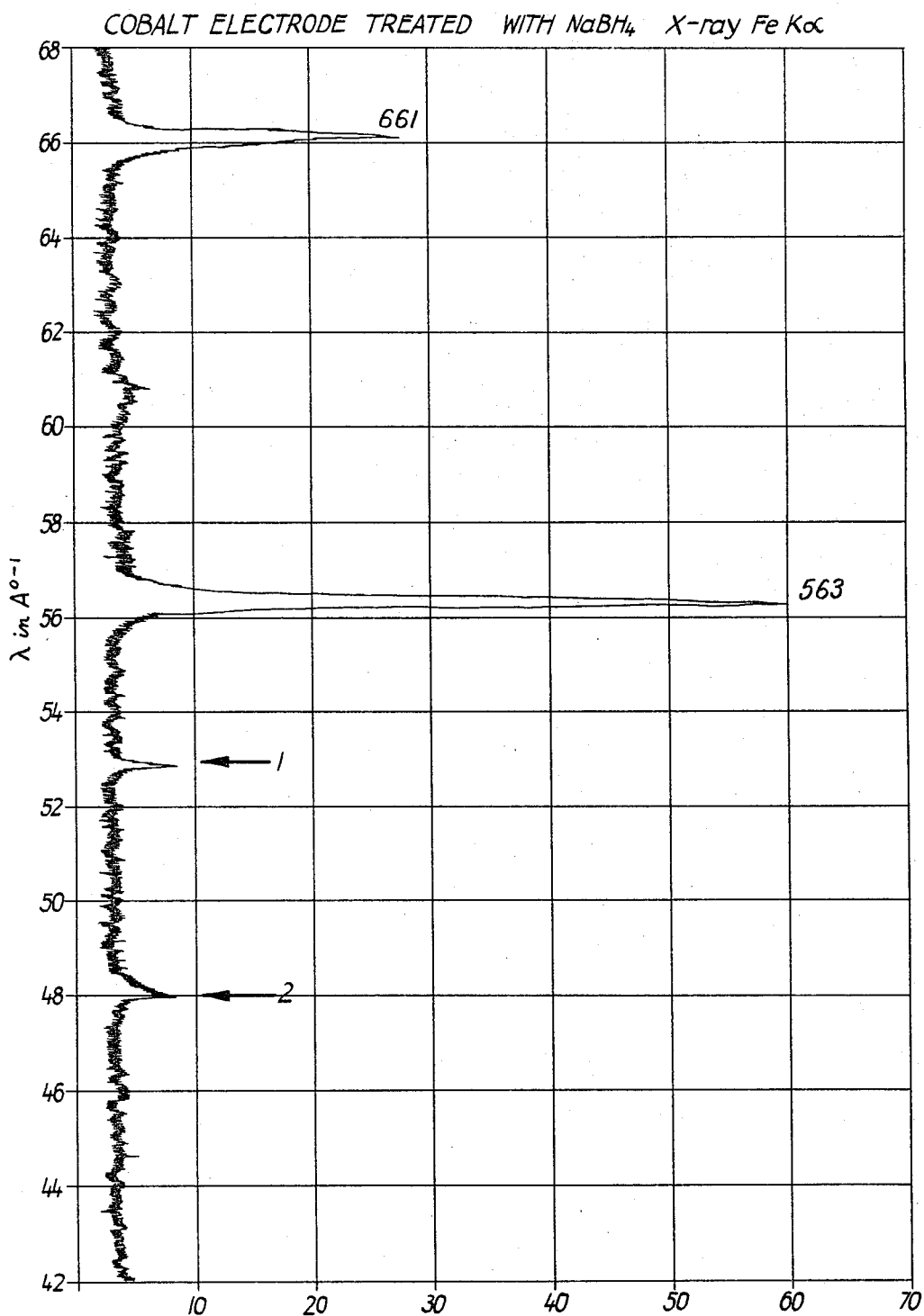

The attached drawings illustrate the X-ray diffraction pattern of porous metallic bodies whereby FIGURE 1 illustrates the X-ray diffraction pattern of an untreated porous cobalt electrode while FIGURE 2 illustrates the X-ray diffraction pattern of a porous cobalt electrode treated with an alkaline solution of sodium boron hydride according to the present invention.

FIG. 2 clearly shows, in addition to the peaks at 661 and 563, two additional peaks 1 and 2 indicated by arrows. These additional peaks are absent in FIG. 1 as indicated by the arrows 1 and 2. While the peaks at 661 and 563 indicate the presence of cubic crystals in both X-ray diffraction patterns, peak 1 in FIG. 2 indicates the presence of hexagonal crystals. Peak 2 in FIG. 2 has not yet been explained. However, these two additional peaks 1 and 2 in FIG. 2 clearly demonstrate that activation according to the present invention produce significant changes in the crystal structure of the metallic catalyst.

Another criterion of the changed properties of the hydrogen-containing nickel, iron, cobalt lattices is its ability to form amalgams with mercury, which does, for instance, not take place with the pure and non-activated, non-catalytic metallic nickel.

It is another aspect of the invention that the sorbed hydrogen may be removed completely from the metallic lattice by washing away the alkaline solution with water, thus causing also reduction of the metallic lattice to its original volume. The thus deactivated lattice may again be activated by treating it with the activating solution, thus again increasing its volume and making it catalytically active. The activating and deactivating procedure may be repeated at any time.

The activated metallic lattices of the invention are susceptible to air. They lose their characteristic behaviour when deactivated so that they may be stored without precautionary measures is their deactivated state and may again be activated when ready for use. Also, if they show a decrease in activity after an extended period of operation, they may readily be reactivated in the described manner to obtain the initial degree of catalytic activity, by immersing the lattice in the activating solution for at least such a period of time as is required to cause evolution of gaseous hydrogen.

The process of the invention can be carried out in any suitable container. Conveniently it is performed in a fuel cell to which there may be added, if desired, the fuel itself for electrochemical conversion.

While in no way limiting the invention thereto, the following examples illustrate the practice of this invention.

Example 1

Nickel powder obtained by decomposing nickel carbonyl and having an average particle size between about 6μ and about 8μ was immersed at room temperature in a 5% solution of sodium boron hydride ($NaBH_4$) in 4 N potassium hydroxide solution. Initially, the metallic powder darkened and its volume increased by about 290%. After about 22 minutes gaseous hydrogen started to escape from the solution. There was used 0.5 cc. of the reducing alkaline solution for one g. of carbonyl nickel. (Bulk weight: 3 g./cc.)

The carbonyl nickel powder activated in this manner was placed between very fine sieves, the perforations of the sieve walls being somewhat smaller than the particles size of the powder to prevent the powder from escaping. This arrangement was placed into a fuel cell as the negative electrode. When operated with methyl alcohol dissolved in 6 N potassium hydroxide solution as fuel, this cell took a load of 10 ma./sq. cm. at room temperature while the same nickel carbonyl powder without activation broke down at a load of 0.08 ma./sq. cm.

Example 2

A sintered cobalt body weighing 20 g. and having a pore volume of 60% was immersed in 12 cc. of a 5% solution of potassium boron hydride $KBH_4$ in 5 N potassium hydroxide solution at a temperature of 32° C. When after 12 minutes considerable gaseous hydrogen evolved the process was discontinued by removing the electrode.

When the activated sintered cobalt body was used as hydrogen-electrode in a fuel cell receiving the hydrogen under a pressure of 0.5–1 atmosphere gauge, it was possible to obtain a load of 30 ma./sq. cm. at room temperature.

Example 3

A body consisting of 10% of palladium, 40% of cobalt and 50% of nickel, by weight, and having a pore volume of 65% was sintered at 1100° C. in a hydrogen current for a period of 10 minutes. Afterwards it was placed in an electrode mounting and treated with a 3% solution of lithium boron hydride $LiBH_4$ in 5.5 N sodium hydroxide solution at a temperature of 26° C. After 40 minutes, the solution had been sufficiently decomposed to saturate the body with atomic hydrogen. The activated hydrogen-electrode was used in a fuel cell and could sustain a load of 500 ma./sq. cm. at room temperature. After being discharged, the electrode immediately reassumed its rest potential.

Example 4

A thorough mixture of 30% of cobalt and 70% of nickel, both by weight, was alloyed at 1500° C. in a protective hydrogen atmosphere. After cooling in the protective gas atmosphere, the alloy was very finely comminuted in a ball mill and the powder fraction having a particle size of 4μ–6μ was sintered in a hydrogen protective atmosphere at a temperature of 1070° C. for a period of 20 minutes to obtain a porous electrode body having a pore volume of 55%.

The porous body was activated by immersion in the solution of Example 1 at a temperature of 45° C. The activated electrode body was placed into a hydrogen fuel cell and enabled the same to be operated at room temperature at a load of 500 ma./sq. cm.

Example 5

Ten grams of iron powder having an average particle size between 12μ and 16μ were impregnated with 15 g. of a 10% solution of hydrazine sulfate in 6 N sodium hydroxide solution at a temperature of 60° C. When the decomposition of the hydrazine in contact with the iron had proceeded sufficiently to cause a strong evolution of gaseous hydrogen, the treatment was discontinued and the resultant catalytically active powder was placed between very fine-mesh nets containing the powder. This body was used as a negative electrode in a fuel cell with glycol and, when operated at room temperature, the cell sustained a load of 50 ma./sq. cm. without damage to the catalytic properties of the electrode.

Example 6

Twenty grams of a homogenous powder composition of 40% nickel, 37% of cobalt, 3% of chromium, and 20% of silver, all by weight, were placed in a mold and uniformly spread therein. An electrode plate was produced by means of a pressure of 2 t./sq. cm. which was then sintered at 950° C. in a hydrogen current. Thereafter, the sintered body is placed in a 10% solution of hydroxylamine in 5 N potassium hydroxide solution to be activated. The temperature was 72° C. the period of activation 30 minutes. The sintered body was used as a hydrogen diffusion electrode according to Example 2.

Example 7

A composition of 20% zirconium, 30% of cobalt, and 50% of nickel, all by weight, was—as described in Example 6—pressed to form an electrode body which was immersed into a solution of lithium aluminum hydride $LiAlH_4$ at a temperature of 5° C. in order for activation. The container of the electrode with the solution was placed under a vacuum of 100 Torr, so that the solution may enter more quickly into the pores of the electrode body. An activated electrode is obtained.

Example 8

Further tests were carried out in a similar manner with sintered copper powder plates and with a sieve electrode filled with titanium powder (grain size 12μ–20μ) whereby also excellent results were obtained.

Example 9

The addition of 2% per weight of thorium to the cobalt alloy according to Example 3 accelerated the activating procedure which required only 28 minutes. The loading capacity of the catalyst used as electrode in a fuel cell element was increased by about 8% compared with the loading capacity of the catalyst used in Example 3. An alloy consisting of 3% niobium and 69% tantalum, both by weight, was milled and thereafter sintered and activated. Said alloy is very stable against the action of all electrolytes. The results achieved with such an electrode were excellent. Details about the various sintering methods are described in the book "Powder metallurgy," Interscience Publishers/New York (Library of Congress Catalog Card No. 61–0446).

Example 10

A nickel cobalt sintered electrode activated with an alkaline solution of sodium boranate which was used for a considerable period of time as hydrogen diffusion electrode in a fuel cell, showed leakiness at the edges of the electrode holder. It was dismantled and provided with a new sealing device. During the time of repair the electrode was exposed to air for about one hour; thereafter, its equilibrium rest potential was 150 mv. higher than before the repair. Therefore, the electrode was once more activated with an alkaline solution of sodium boranate and could thereafter, be used with the same current load as before.

Example 11

The following details are given with respect to the increase in volume of carbonyl nickel powders.

(a) 10 ml. of nickel grade A obtained according to the Mond process showed after activation according to Example 1 a volume of 25 ml. After washing with water it regained its initial volume.

The test has been repeated six times with similar results.

(b) 10 ml. of carbonyl nickel powder grade B obtained according to the Mond process showed after activation according to Example 5, a volume of 29 ml. The initial volume of 10 ml. was also regained by removing the alkaline activating agent.

The following examples illustrate the effectiveness reactivation of electrodes according to the present invention and the speed with which an electrode reactivated in this manner reaches its full operating potential. In the following examples, two identical fuel cells were used for comparison, one containing a hydrogen-evolving additive in the electrolyte while the other one contained none.

Example 12

Fifteen grams of finely divided palladium black was placed between two perforated plates having a mesh of 2 microns and this structure was placed as a fuel electrode into a fuel cell. The cell was filled with 6 N potassium hydroxide electrolyte having dissolved therein two moles of glycol per liter of electrolyte.

For the purpose of pre-treating the palladium black catalyst with nascent hydrogen, 1 g. of sodium boron hydride per liter of electrolyte was introduced into the electrolyte either in powder or tablet form.

Identical results were obtained when the sodium boron hydride was replaced either by lithium boron or by potassium boron hydride.

In one test, the electrode was immersed in the electrolyte immediately after a 24-hour storage period in the air while, in the other case, it was first subjected to a treatment with nascent hydrogen evolving from the additive in the electrolyte.

Column 1 of the following Table I indicates the time (in minutes) elapsed from the beginning of the fuel cell operation and the hydrogen treatment, respectively. Column 2 shows the deviation of the electrode potential from the rest potential in the case of the electrode which is operated without the electrolyte additive and column 3 shows the same deviation for the potential of the pre-treated electrode.

TABLE I

| | Deviation from Rest Potential (mv.) | |
| --- | --- | --- |
| | Without H$_2$ pre-treatment | With H$_2$ pre-treatment |
| Minutes of Treatment: | | |
| 0 | +280 | +50 |
| 5 | +278 | +2 |
| 10 | +272 | 0 |
| 60 | +240 | 0 |
| 1,440 | +25 | 0 |

As can be seen from the above table, the rest potential is reached much more rapidly with an electrode pre-treated according to the invention than with one that is not so treated. When the electrode is immersed in the conventional electrolyte-fuel solution immediately after dry storage, a small deviation from the rest potential still exists after 24 hours of operation while no much deviation is noted after only 10 minutes of hydrogen pre-treatment.

Example 13

Granulated activated carbon having an average particle diameter of about 2.6 mm. and a particle length of about 5 mm. is introduced into a container holding a 5% solution of platinum chloride (H$_2$PtCl$_6$). The container is kept under a vacuum of 12 mm. Hg for 30 minutes. Afterwards, the solution containing the carbon grains is placed on a filter to permit the platinum chloride solution to drop off. Thereupon, the platinum chloride-impregnated carbon is placed into a glass tube and treated with the vapors of boiling formic acid whereby the platinum salt is reduced to highly active, very finely divided metallic platinum. If desired, the formic acid vapor treatment may be accompanied by an additional treatment of the material with a weak current of hydrogen or another inert gas. The total treatment lasts for about an hour and results in an electrode catalyst consisting of about 96%, by weight, of activated carbon and 4%, by weight, of platinum.

Eight grams of this material are placed between two parallel circular nickel meshes having a mesh size of about 1 mm. This structure serves as the fuel electrode in a fuel cell. When it is desired to operate the cell, it is filled with 5 N sodium hydroxide solution containing 1.5 mol methanol per liter of sodium hydroxide electrolyte.

Comparative tests show that the rest potential is reached only after 730 minutes of operation if no additive is introduced into the electrolyte. If one cubic centimeter of 80% hydrazine per liter of electrolyte is added to the electrolyte, the evolving nascent hydrogen reactivates the catalyst rapidly and the rest potential is reached after only a minute.

Identical results were obtained when the hydrazine was placed by 5 ccm. of 30% hydroxylamine.

Example 14

A finely divided palladium-silver alloy containing 10%, by weight, of silver and having a grain size of an average of 5$\mu$ to 7$\mu$ is compressed under a pressure of 480 kg./sq. cm. to form a disc-shaped electrode of 40 mm. diameter and a thickness of 3 mm. After compression, the electrode body is sintered in an hydrogen current for 20 minutes at a temperature of 900° C. The weight of the electrode is 19 g. This electrode is built into a fuel cell and the same is put into operation by filling it with 5 N potassium hydroxide solution. Carbon monoxide (CO) is introduced into the cell as fuel.

When this fuel cell was operated without an electrolyte additive, it required 590 minutes to reach the rest potential. When 0.7 g. of lithium hydride per liter of electrolyte was added, the rest potential was reached in 2.5 minutes.

Example 15

Following the same method as described in Example 13 granulated active coal was impregnated with iridium, whereby after the reduction of the metal salt to metal and upon drying the impregnated material the quantity of iridium was 6% per weight. The coal granulate was filled into a sieve electrode and built into a fuel cell. Thereupon 1 g. of lithium aluminum hydride was added to 150 ccm. of the electrolyte (6 N KOH) filled in the cell. The electrolyte contained 2 moles glycerine per liter of potassium hydroxide electrolyte. The rest potential was reached at room temperature after 100 seconds. When no lithium aluminum hydride was added to the electrolyte the rest potential was reached in 24½ hours.

The same results were obtained when porous active coal was impregnated with 10% by weight of rhodium and in another experiment with 10% by weight of ruthenium.

Example 16

A standard hydrogen electrode, i.e. a platinized platinum electrode having lost its catalytic activity by exposure to air is immersed into the same solution as used in Example 6 for a few seconds (4 to 10 seconds), removed, washed with distilled water. It is then useful again for catalytic reactions. This is in contrast to the conventional procedure which would involve time-consuming activation with gaseous hydrogen.

While the invention has been described in connection with certain now preferred embodiments, it will be clearly understood that many modifications and variations may occur to the skilled in the art without departing from the spirit and scope thereof as defined in the appended claims.

We claim:

1. A process of producing a catalytic body which comprises sorbing nascent hydrogen into a body of an alkali-resistant crystalline metal lattice which is hydrogen sorbing by contacting the body with an alkaline solution comprising a hydrogen-generating strong reducing complex hydride.

2. The process of claim 1 in which the reducing agent is selected from the group consisting of hydrazine, hydroxylamine, their derivatives, in which at least one hydrogen atom is substituted by an organical radical, and their salts.

3. The process of claim 1 in which the reducing agent is selected from the group consisting of an alkali metal hydride, alkali metal boron hydride and an alkali metal aluminum hydride.

4. The process of claim 1 which is carried out at a temperature of about 5° to 80° C.

5. A process of producing a catalytic body which comprises impregnating with nascent hydrogen while essentially no gaseous hydrogen evolves, the body of an alkali-resistant crystalline metal lattice which is hydrogen sorbing by contacting the body with an alkaline solution comprising a hydrogen-generating strong reducing complex hydride, the lattice comprising at least one solid alkali-resistant metal selected from the group consisting of Groups IVB, VB, VIB and VIII of the Periodic Chart and a platinum metal.

6. A process of producing a catalytic body which comprises impregnating with nascent hydrogen while essentially no gaseous hydrogen evolves, the body of an alkali-resistant crystalline metal lattice which is hydrogen sorbing by contacting the body with an alkaline solution comprising a hydrogen-generating strong reducing complex hydride until the lattice is practically fully saturated with the hydrogen, the lattice consisting of at least one solid alkali-resistant metal selected from the group consisting of Groups IVB, VB, VIB and VIII of the Periodic Chart and a platinum metal.

7. A process of producing a catalytic body which comprises sorbing nascent hydrogen into a mechanically self-sustaining body comprising at least one alkali-resistant crystalline metal lattice which is hydrogen sorbing by contacting the body with an alkaline solution comprising a hydrogen-generating strong reducing complex hydride.

8. A process of producing a catalytic body which comprises sorbing nascent hydrogen into a mechanically self-sustaining porous electrode comprising at least one alkali-resistant crystalline metal lattice which is hydrogen sorbing by contacting the electrode with an alkaline solution comprising a hydrogen-generating strong reducing complex hydride.

9. The process of claim 8 in which the reducing agent is selected from the group consisting of an alkali metal hydride, alkali metal boron hydride and an alkali metal aluminum hydride.

10. A process of producing a catalytic body which comprises sorbing nascent hydrogen into a powdered metal comprising at least one alkali-resistant crystalline metal lattice which is hydrogen sorbing by contacting the powdered metal with an alkaline solution comprising a strong reducing complex hydride.

11. A process of producing a catalytic body which comprises sorbing nascent hydrogen into a powdered metal comprising at least one alkali-resistant crystalline metal lattice which is hydrogen sorbing by contacting the powdered metal with an alkaline solution comprising a strong reducing complex hydride, until the lattice is essentially fully impregnated with the hydrogen, and forming the hydrogen-impregnated metal into an electrode.

12. A process for increasing the catalytic activity of a catalytic body which comprises sorbing nascent hydrogen into a porous body comprising at least one alkali-resistant crystalline metal lattice which is hydrogen sorbing by contacting the body with an alkaline solution comprising a hydrogen-generating strong reducing complex hydride.

13. A process for increasing the catalytic activity of a platinum metal electrode which comprises impregnating with nascent hydrogen a platinum metal electrode by contacting the electrode with an electrolyte comprising an alkaline solution of a hydrogen-generating strong reducing complex hydride.

14. A process of producing a catalytic body which comprises sorbing nascent hydrogen into the body of an alkali-resistant crystalline metal lattice which is hydrogen sorbing by contacting the body with an alkaline solution comprising a hydrogen-generating strong reducing agent and discontinuing the sorption of hydrogen after the body is substantially impregnated with hydrogen.

References Cited

UNITED STATES PATENTS

| | | | |
|---|---|---|---|
| 2,461,661 | 2/1949 | Schlesinger | 213—361 |
| 2,963,405 | 12/1960 | Seemuller | 213—361 X |
| 3,183,123 | 5/1965 | Haworth | 136—86 |
| 3,183,124 | 5/1965 | Jasinski | 136—86 X |
| 3,210,157 | 10/1965 | Lewis | 252—432 |
| 3,067,276 | 12/1962 | Gruneberg et al. | 252—412 |
| 2,895,918 | 7/1959 | MacCormack | 252—412 |
| 2,208,616 | 5/1943 | Wellman et al. | 252—470 |
| 2,319,453 | 3/1965 | Wynn | 136—86 |

FOREIGN PATENTS

| | | |
|---|---|---|
| 705,973 | 3/1965 | Canada. |

OTHER REFERENCES

A Study on Sodium Borohydride, E. H. Jensen, NYT Nordisk Forlag Arnold Busck, Copenhagen, 1954 (p. 24, Table I, p. 44 relied on).

ALLEN B. CURTIS, *Primary Examiner.*

WINSTON A. DOUGLAS, *Examiner.*